United States Patent
Sebok et al.

(10) Patent No.: US 10,062,200 B2
(45) Date of Patent: Aug. 28, 2018

(54) SYSTEM AND METHOD FOR DISPLAYING VOLUMETRIC IMAGES

(71) Applicant: Dental Imaging Technologies Corporation, Hatfield, PA (US)

(72) Inventors: David Albert Sebok, Eagleville, PA (US); Michael Joseph Parma, Chalfont, PA (US); George John Cocco, Havertown, PA (US)

(73) Assignee: DENTAL IMAGING TECHNOLOGIES CORPORATION, Hatfield, PA (US)

( * ) Notice: Subject to any disclaimer, the term of this patent is extended or adjusted under 35 U.S.C. 154(b) by 73 days.

(21) Appl. No.: 14/678,636

(22) Filed: Apr. 3, 2015

(65) Prior Publication Data

US 2016/0292912 A1 Oct. 6, 2016

(51) Int. Cl.
*G06T 15/08* (2011.01)
*G06T 15/50* (2011.01)
(Continued)

(52) U.S. Cl.
CPC ........ *G06T 15/503* (2013.01); *G06F 3/04815* (2013.01); *G06T 15/005* (2013.01);
(Continued)

(58) Field of Classification Search
CPC ..... G06T 15/08; G06T 19/20; G06T 2210/41; G06T 15/00
See application file for complete search history.

(56) References Cited

U.S. PATENT DOCUMENTS 6,269,196 B1 7/2001 Hamburg
2007/0012101 A1 1/2007 Rottger et al.
(Continued)

FOREIGN PATENT DOCUMENTS

EP 0642104 A1 3/1995
TW 200806258 A 2/2008
(Continued)

OTHER PUBLICATIONS

Ferre, Maria, Anna Puig, and Dani Tost. "A framework for fusion methods and rendering techniques of multimodal volume data." Computer Animation and Virtual Worlds 15.2 (2004). pp. 63-77.*
Pinto et al., "Two-level interaction transfer function design combining boundary emphasis, manual specification, and evolutive generation." Computer Graphics and Image Processing, 2006, SIBGRAPHI'06. 19th Brazilian Symposium. IEEE 2006.*
(Continued)

*Primary Examiner* — Diane Wills
(74) *Attorney, Agent, or Firm* — Michael Best & Friedrich LLP

(57) ABSTRACT

A visualization system for displaying volumetric renderings includes a display, a user input actuator that is movable over a first range, a second range, and a third range, and a processor. The second range is located between the first range and the third range. The processor is configured to generate a first volumetric rendering according to a first transfer function when the user input actuator is positioned in the first range, and generate the first volumetric rendering according to a second transfer function when the user input actuator is positioned in the third range. The second transfer function is different than the first transfer function. The processor is further configured to generate the first volumetric rendering according to a blending of the first transfer function and the second transfer function when the user input actuator is positioned in the second range, and display the first volumetric rendering on the display.

20 Claims, 18 Drawing Sheets

(51) Int. Cl.
  *G06F 3/0481* (2013.01)
  *G06T 15/00* (2011.01)
  *G06T 19/20* (2011.01)

(52) U.S. Cl.
  CPC .............. *G06T 15/08* (2013.01); *G06T 19/20* (2013.01); *G06T 2210/41* (2013.01)

(56) References Cited

U.S. PATENT DOCUMENTS

| | | | | |
|---|---|---|---|---|
| 2010/0246957 A1* | 9/2010 | Visser | .................... | G06T 19/003 382/173 |
| 2012/0218290 A1* | 8/2012 | Waschbuesch | ........ | G09G 5/377 345/619 |
| 2014/0292799 A1* | 10/2014 | Shekey | .................... | G09G 5/06 345/594 |
| 2016/0078687 A1* | 3/2016 | Van Bree | .............. | A61M 16/06 345/419 |

FOREIGN PATENT DOCUMENTS

| | | |
|---|---|---|
| WO | 2004102458 A2 | 11/2004 |
| WO | 2006048796 A1 | 5/2006 |
| WO | 2006048802 A2 | 5/2006 |
| WO | 2008015592 A2 | 2/2008 |
| WO | 2008065586 A2 | 6/2008 |
| WO | 2009040719 A2 | 4/2009 |
| WO | 2009057031 A1 | 5/2009 |

OTHER PUBLICATIONS

Srivastava et al, "Interactive transfer function modification for volume rendering using pre-shaded sample runs", The Computer Society, 2002, Proceedings of the 10th Pacific Conference on Computer Graphics and Applications, Center for Visual Computing, Computer Science, Stony Brook University, USA.

Abellan P. et al, "Multimodal volume rendering with 30 textures", Computers & Graphics, 2008, pp. 412-419, vol. 32, No. 4, Elsevier Ltd.

Francisco De Moura Pinto et al,"Two-Level Interaction Transfer Function Design Combining Boundary Emphasis, Manual Specification and Evolutive Generation", The Computer Society, 2006, pp. 281-288, XIX Brazillian Symposium on Computer Graphics and Image Processing.

Hadwiger M et al, "High-quality two-level volume rendering of segmented data sets on consumer graphics hardware", The Computer Society, 2003, pp. 301-308, Proceedings of teh 14th IEEE Visualization Conference, Seattle, WA, USA.

Bernardon et al, "Interactive Transfer Function Specification for Direct Volume Rendering of Disparate Volumes", SCI Institute Technical Report, 2007, 9 pages, The University of Utah, Salt Lake City, Ut.

Akira et al, "AniViz: A Template-Based Animation Tool for Volume Visualization", IEEE Computer Graphics and Applications, 2010, pp. 61-71, IEEE Computer Society, University of California, Davis.

Extended European Search Report from the European Patent Office for Application No. 16162436.6 dated Sep. 2, 2016 (14 pages).

* cited by examiner

SYSTEM AND METHOD FOR DISPLAYING VOLUMETRIC IMAGES

FIELD OF INVENTION

The present invention relates to generating volumetric renderings according to different transfer functions based on user input.

SUMMARY

In one embodiment, the invention provides a visualization system including a display, a user input actuator, and a processor. The user input actuator is movable over a first range, a second range, and a third range. The second range is located between the first range and the third range. The processor is coupled to the user input actuator and the display. The processor is configured to generate a first volumetric rendering according to a first transfer function when the user input actuator is positioned in the first range, and generate the first volumetric rendering according to a second transfer function when the user input actuator is positioned in the third range. The processor is also configured to generate the first volumetric rendering according to a blending of the first transfer function and the second transfer function when the user input actuator is positioned in the second range, and to display the first volumetric rendering on the display.

In another embodiment the invention provides a method of displaying volumetric renderings including receiving a user input via a user input actuator. The user input actuator is movable over a first range, a second range, and a third range. The second range is located between the first range and the third range. The method also includes determining a position of the user input actuator, generating a first volumetric rendering according to a first transfer function when the user input actuator is positioned in the first range, and generating the first volumetric rendering according to a second transfer function when the user input actuator is positioned in the third range. The method further includes generating the first volumetric rendering according to a blending of the first transfer function and the second transfer function when the user input actuator is positioned in the second range, and displaying the first volumetric rendering on the display.

Other aspects of the invention will become apparent by consideration of the detailed description and accompanying drawings.

DETAILED DESCRIPTION

Figure 1:
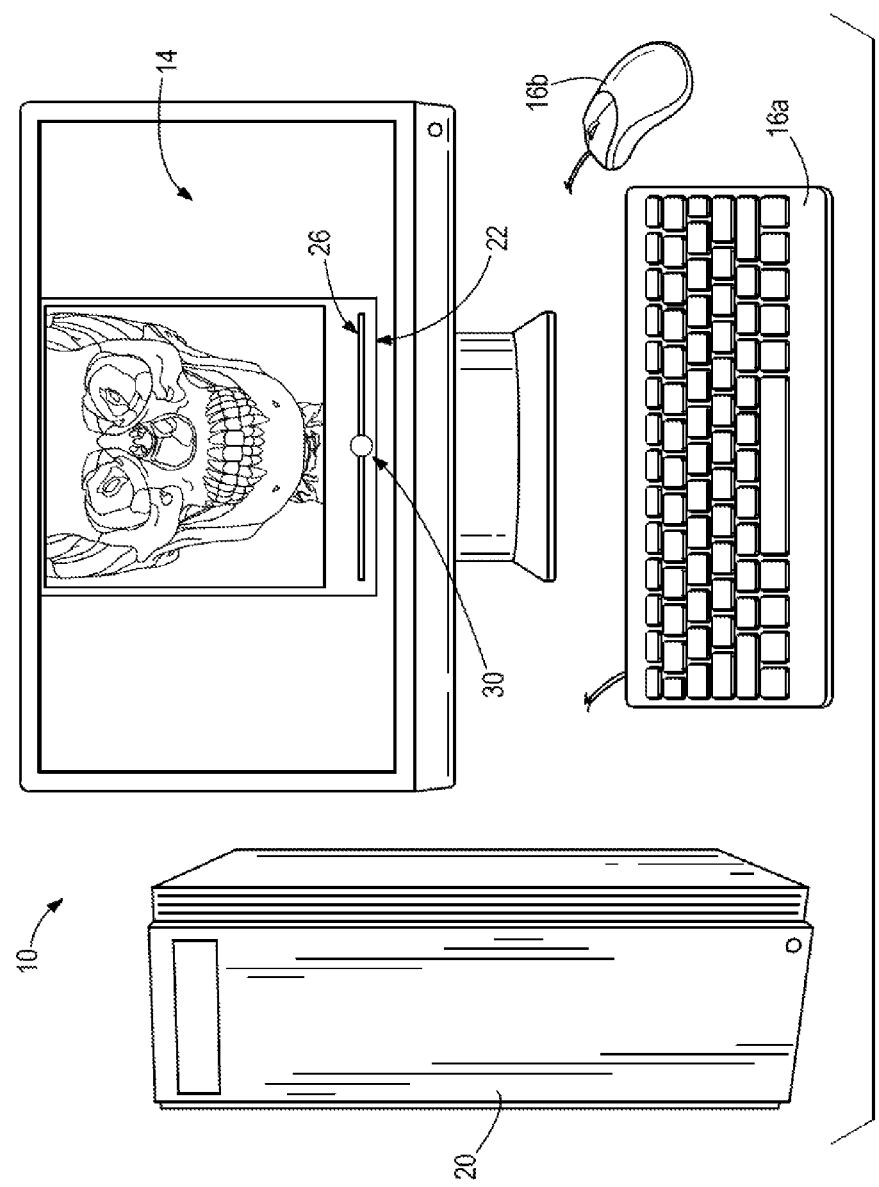
FIG. 1 is an elevation view of a visualization system according to one construction of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., instructions stored on non-transitory computer-readable medium) executable by one or more processing units, such as a microprocessor and/or application specific integrated circuits ("ASICs"). As such, it should be noted that a plurality of hardware and software based devices, as well as a plurality of different structural components may be utilized to implement the invention. For example, "servers" and "computing devices" described in the specification can include one or more processing units, one or more computer-readable medium modules, one or more input/output interfaces, and various connections (e.g., a system bus) connecting the components.

Volumetric rendering is an effective method for presenting complex three-dimensional data generated by different medical imaging methods such as, for example, computed tomography (CT) and magnetic resonance imaging (MRI). After data is acquired by an imaging system and transferred to a visualization system, a transfer function assigns an opacity and/or a color value to each voxel value (i.e., each data point value in the three-dimensional volumetric rendering). The visualization system then displays the three-dimensional (3D) data according to the values assigned by the transfer function. Each transfer function is defined by one or more control points associated with parameters that determine how each of the opacity and color values is assigned to each voxel. For example, some transfer functions can include 50 or more parameters while others can include only a few parameters. In some embodiments, the number of parameters included in a transfer function is proportional to the number of control points defining the transfer function. By adjusting these parameters, a number of different views of the 3D data become available. Each view highlights a different aspect of the underlying anatomical structures. Different views may aid imaging specialists to identify and diagnose different abnormalities.

Imaging specialists may want to view the 3D data in several different views (e.g., to utilize different volumetric renderings) while diagnosing a particular patient. In each view, the imaging specialist may look for something different to verify his/her diagnosis. However, adjusting the parameters of the transfer function to display the different image views desired by the specialists may become a complicated task. The image specialist would need to know which parameters to change and how to change them to yield the desired image view (e.g., volumetric rendering).

One simplified mechanism for controlling volumetric renderings may include, for example, providing a set of preset buttons on a user interface. Each preset button would correspond to a different transfer function and, when selected, would cause the system to display the volumetric data according to a specific transfer function thereby highlighting different aspects of the volumetric image data. For example, one preset button may cause the image data to highlight a patient's skin surface, while another may be used to highlight the patient's bone structure, etc. These preset buttons, though relatively simple to use, would not offer full customization of the transfer function. The presets might be predetermined by the manufacturer of the visualization application and, therefore, the imaging specialist is restricted to a particular set of pre-determined views instead of having access to all possible image views.

Alternatively, the visualization application may be configured to provide the imaging specialist with a transfer function editor that is designed to provide complete control and flexibility for changing the parameters of a transfer function. Such transfer function editors might include a plurality of buttons or points that would be adjusted individually to adapt the transfer function. As a result, despite providing a more comprehensive range of customization, the operation of such a detailed transfer function editor would become complex and confusing to the imaging specialist. This too would restrict full utilization of the transfer function editors to a small fraction of imaging specialists that are sufficiently familiar with the details of the transfer function operations.

Furthermore, the use of either the simplified preset buttons or the more comprehensive transfer function editors would require the imaging specialist to at least temporarily focus on the control interface instead of focusing on the volumetric image data itself. In fact, a comprehensive transfer function editor would likely require use of the entire display due to the size and complexity of the adjustable parameters for each transfer function. As a result, the imaging specialist might have to continually change focus between the displayed image and the control mechanism in order to determine whether the adjustment to the transfer function yielded the desired view. Such workflow is cumbersome and interrupts the imaging specialists' diagnosis of the patient.

FIG. 1 shows an example of a visualization system 10 that provides users with an easy to use interface and a detailed level of control to customize transfer functions used to display 3D image data. The visualization system 10 is coupled to an imaging system such as an MRI or CT system (not shown). The imaging system acquires medical imaging data and transfers the image data to the visualization system 10 for display, analysis, and, in some constructions, storage. In various implementations, the visualization system 10 may be directly coupled to the imaging system and may even be integrated as part of the imaging system. In other implementations, the visualization system 10 is positioned in a separate room and is detached from the imaging system. In still other implementations, the visualization system 10 is implemented on a desktop computer that accesses medical image data stored on a medical PACS ("picture archiving communication system") through a local area network, a wide area network, or an Internet connection.

The visualization system 10 of FIG. 1 includes a display 14 for displaying image views of three dimensional renderings, one or more user input devices 16a, 16b, and a processing unit 20. The user input devices 16a, 16b are used to interact with the visualization system 10 and change the volume rendering parameters (e.g., the transfer function), the size of the image (e.g., zoom in and out of the image), the orientation of the image (e.g., rotate the image), etc. In the illustrated construction, the user input devices include a keyboard 16a and a mouse 16b. In other implementations, the visualization system 10 may include, additionally or alternatively, other separate devices and/or actuators that facilitate user interaction. For example, in some implementations, the display 14 includes a touch-sensitive screen (e.g. a tablet computing device) that can be used as a user input device.

The visualization system 10 includes a user input actuator 22 that allows a user to adjust the transfer function to display different renderings of the volumetric image. In the example of FIG. 1, the user input actuator 22 can be a virtual linear actuator that is part of a graphical user interface generated by the processing unit 20 and displayed on the display 14. The virtual linear actuator 22 includes a path 26 and a position indicator 30. The position indicator 30 is moved by a user along the path 26 using the touch sensitive screen of the display 14 or by using the mouse 16b. In some implementations, the path 26 is a continuous path that includes a plurality of non-restrictive positions and the position indicator 30 can move in a continuous manner along the path 26. In other constructions, the path 26 includes discrete, pre-determined positions and the position indicator 30 may only move between those discrete, pre-determined positions.

Figure 2:
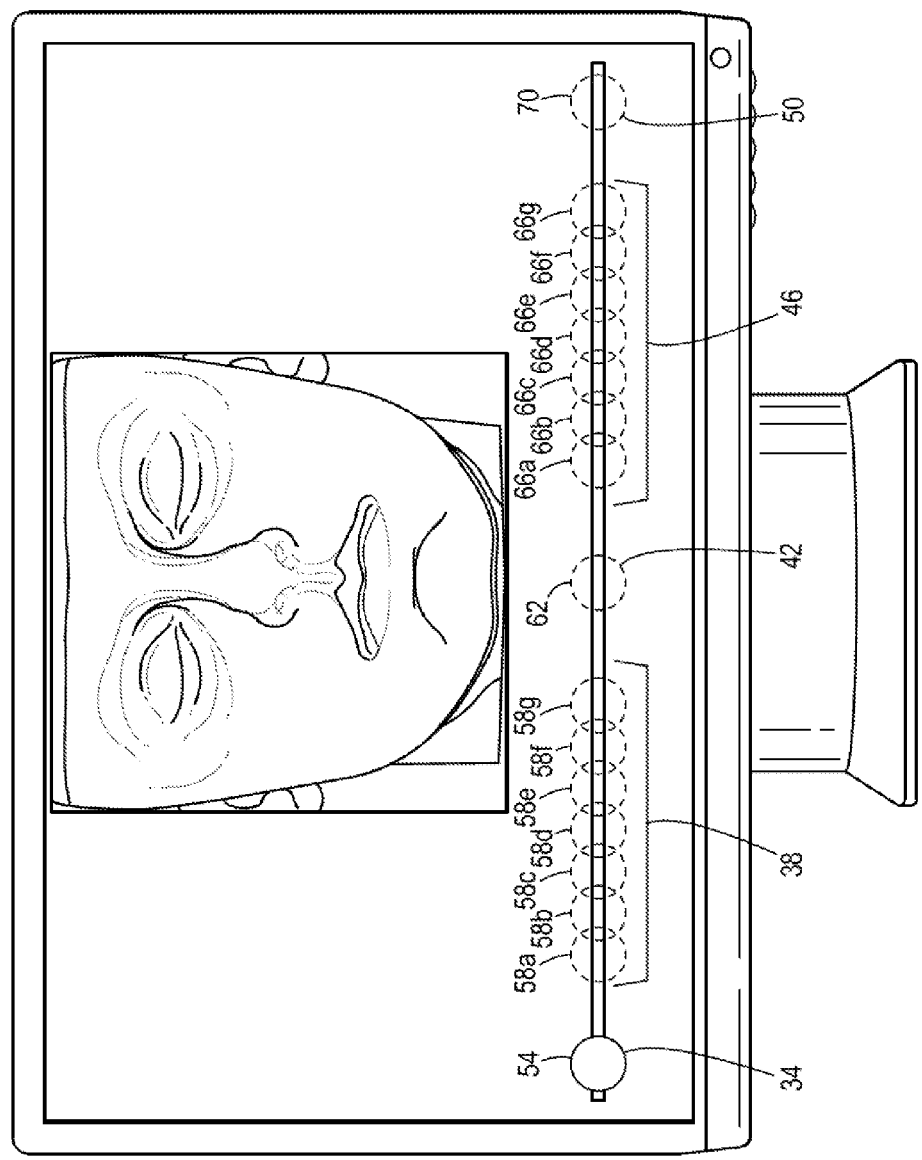
FIG. 2 is a user interface displayed on the screen of the system of FIG. 1 including one example of a user input actuator of the visualization system.

As shown in FIG. 2, the path 26 includes a first range 34, a second range 38, a third range 42, a fourth range 46, and a fifth range 50. The position of the user input actuator 22 within these ranges helps determine which transfer function(s) are used to generate the displayed volumetric image and the degree to which certain parameters of the transfer functions are adjusted. In the example of FIG. 2, the first range 34, the third range 42, and the fifth range 50 each include only a single position 54, 62, and 70, respectively. The second range 38 is positioned between the first range 34 and the third range 42 and includes a plurality of positions 58a-58g as shown in phantom in FIG. 2. The fourth range 46 is positioned between the third range 42 and the fifth range 50 and also includes multiple positions 66a-66g. In this example, the second range 38 and the fourth range 46 include the same number of positions 58a-h, 66a-h. Although the example of FIG. 2 shows seven positions for each of the second range 38 and the fourth range 46, other implementations may include more or fewer positions in each range. Similarly, in other implementations, the second range 38 may include more or fewer positions than the fourth range 46 to provide for an increased level of adjustment for one transfer functions as described in further detail below.

The example of FIG. 2 includes a user input actuator 22 including a linear path 26 and a position indicator 30 as shown in FIG. 1. The path 26 may include multiple indicators that illustrate to the user the possible positions for the position indicator 30. Alternatively, the path 26 may include a colored or non-colored bar or a similar interface to communicate information regarding the separate ranges. In other implementations, linear user input actuator 22 may be replaced with another control. For example, in FIG. 3, the user input actuator is provided in the form of a circular dial actuator A circular dial actuator allows for an infinite continuous control path that does not have a start or finish position. As a result, the user can continue moving the position indicator 30 in a single circular direction to cycle between transfer functions instead of moving a linear control 30 back and forth. The circular dial actuator of FIG. 3 includes the same five ranges as the linear actuator of FIG. 2. However, the first range 34 and the fifth range 50 are both near the top of the dial with no range in between. The third range 42 may be positioned at the bottom of the dial while the second range 48 and the fourth range 46 are located between the top position and the bottom position on either side of the dial interface. In some implementations, the first and fifth ranges 34, 50 may represent the same transfer function with the same parameters and occupy the same space at the top of the dial. However, in other constructions, the system can be configured to advance to yet another transfer function when the position indicator 30 continues to move past range 50.

Figure 3:
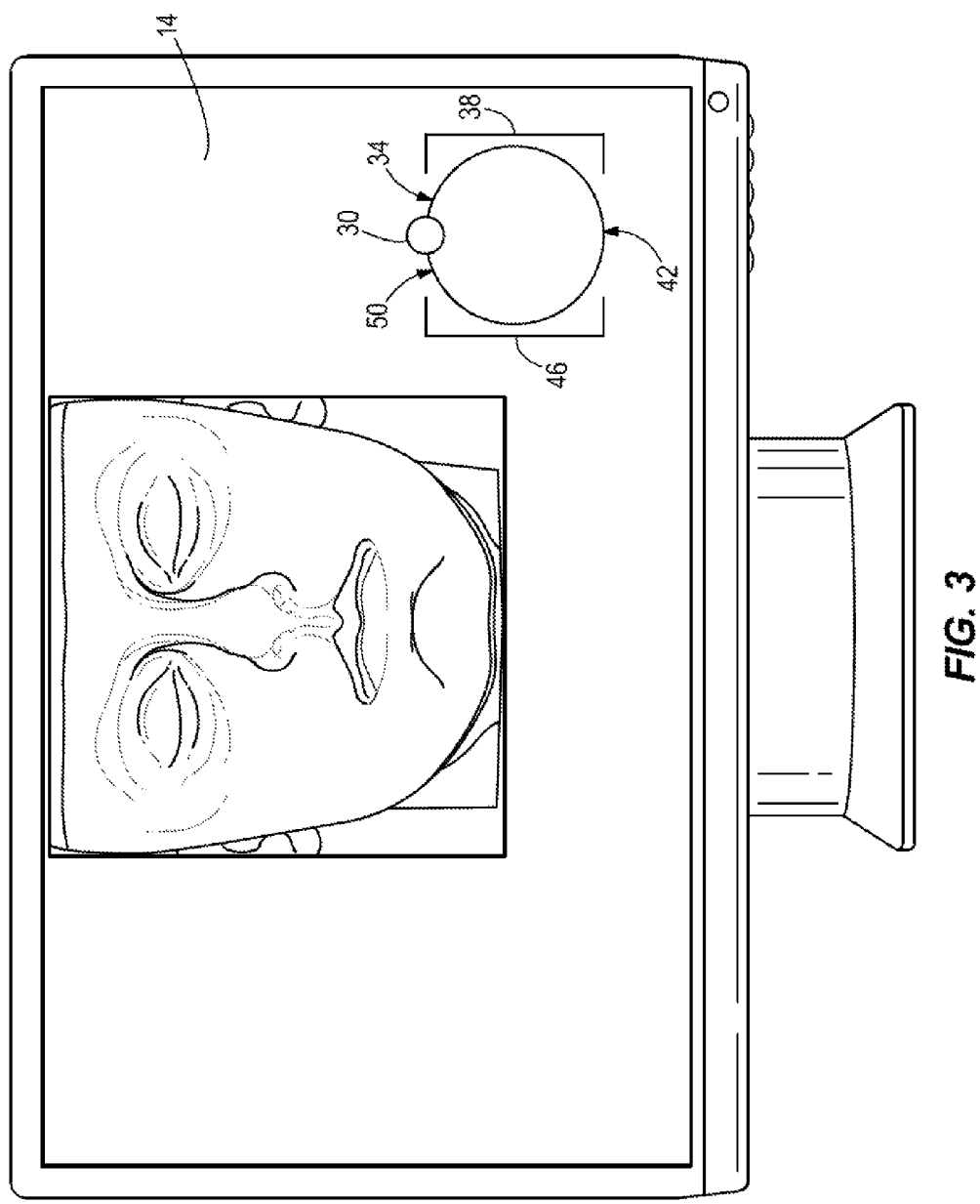
FIG. 3 is a user interface displayed on the screen of the system of FIG. 1 including a second example of a user input actuator of the visualization system.
Figure 4:
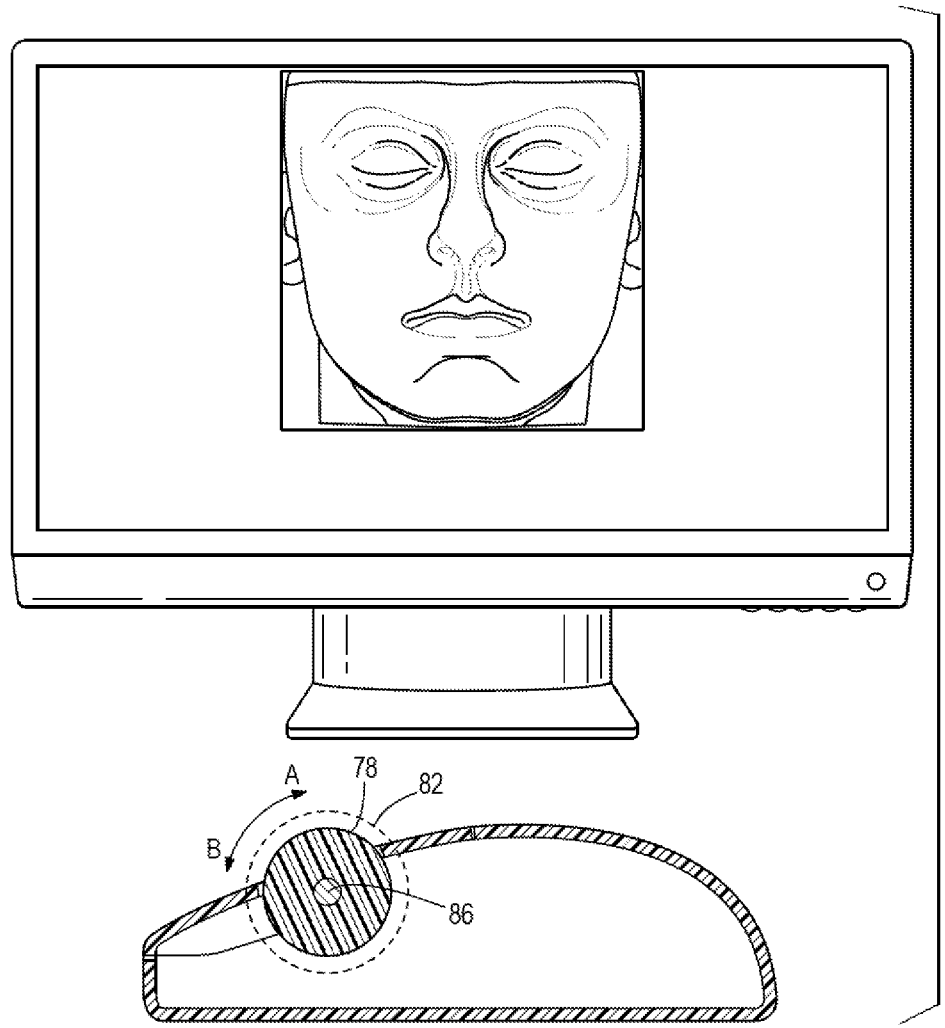
FIG. 4 is a cross-sectional view of a third example of a user input actuator for the visualization system of FIG. 1.

Although the examples of FIGS. 2 and 3 show the user input actuator 22 presented in the form of a virtual control displayed on a graphical user interface, in other implementations, the user input actuator 22 may implemented as a dedicated hardware device (i.e., a physical slider bar or a physical knob dial). In still other implementations, part of the user input device 16b can be utilized as the user input actuator 22. For example, FIG. 4 shows a cross-section of a mouse 16b with an internal scroll wheel 78. The scroll wheel 78 is rotated by the user along a circular trajectory 82 around center point 86. Although the scroll wheel 78 does not include a position indicator 30 (as in the examples of FIGS. 2 and 3), the rotation of the scroll wheel can still be used to cycle through various ranges like the circular dial actuator of FIG. 3. Instead of focusing on a particular location of a position indicator 30, the user can focus on changes generated on the volume rendering.

Figure 5:
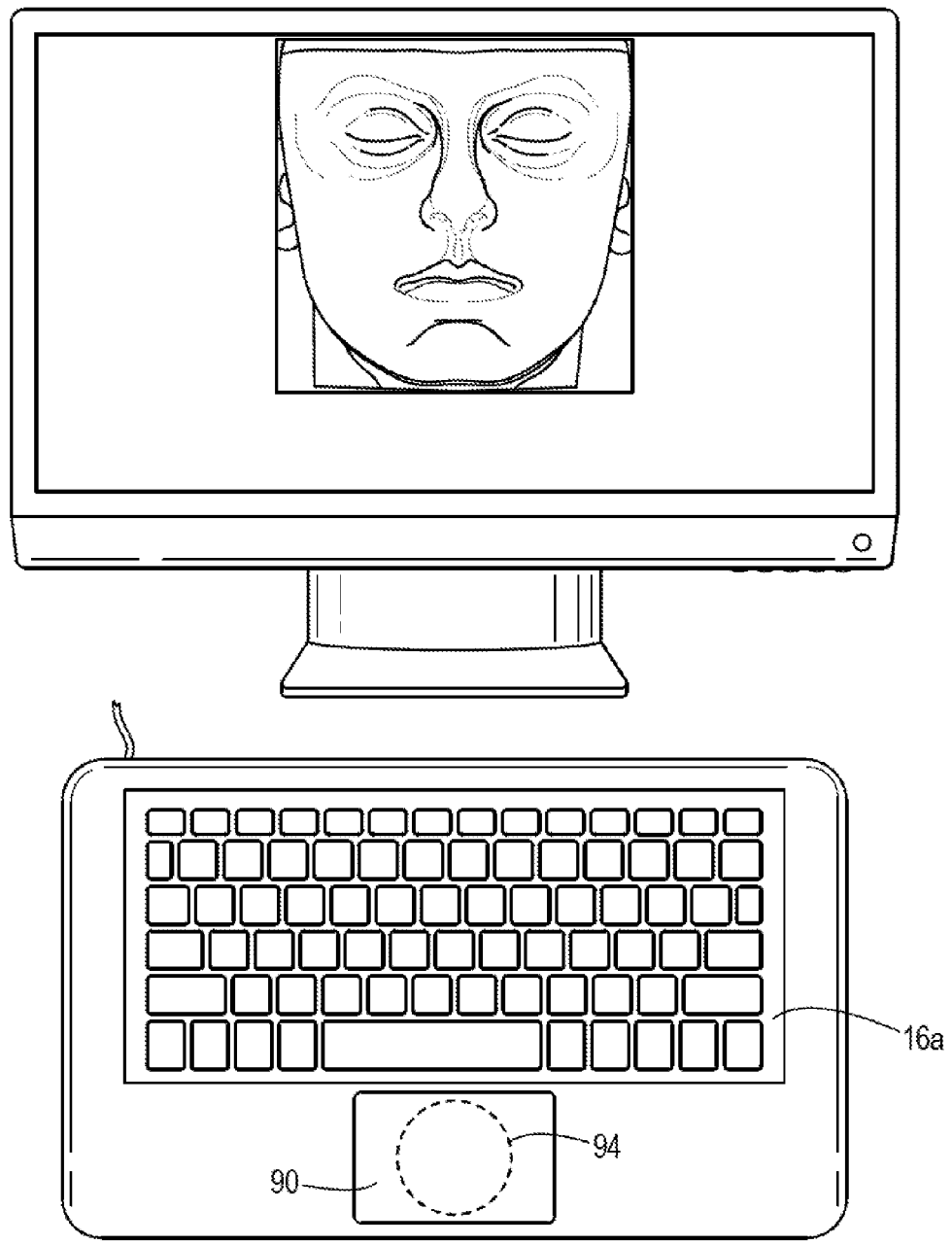
FIG. 5 is a perspective view of another example of a visualization system including a fourth example of a user input actuator.

FIG. 5 illustrates another example in which the touch pad 90 of a laptop or desktop computer is used as the user input actuator 22. In some implementations, the user moves her finger along the touch pad 90 in a circular shape to achieve the circular range adjustment as discussed above in reference to FIG. 3. In other systems, the user moves his/her finger linearly to achieve the adjustment mechanism discussed above in reference to FIG. 2. In still other systems, the required movement can be adjusted based on user preference or may include other shapes (e.g., a rectangle including four single, point "ranges" (in each of the four corners) and four continuous adjustment "ranges" (each side)).

Figure 6:
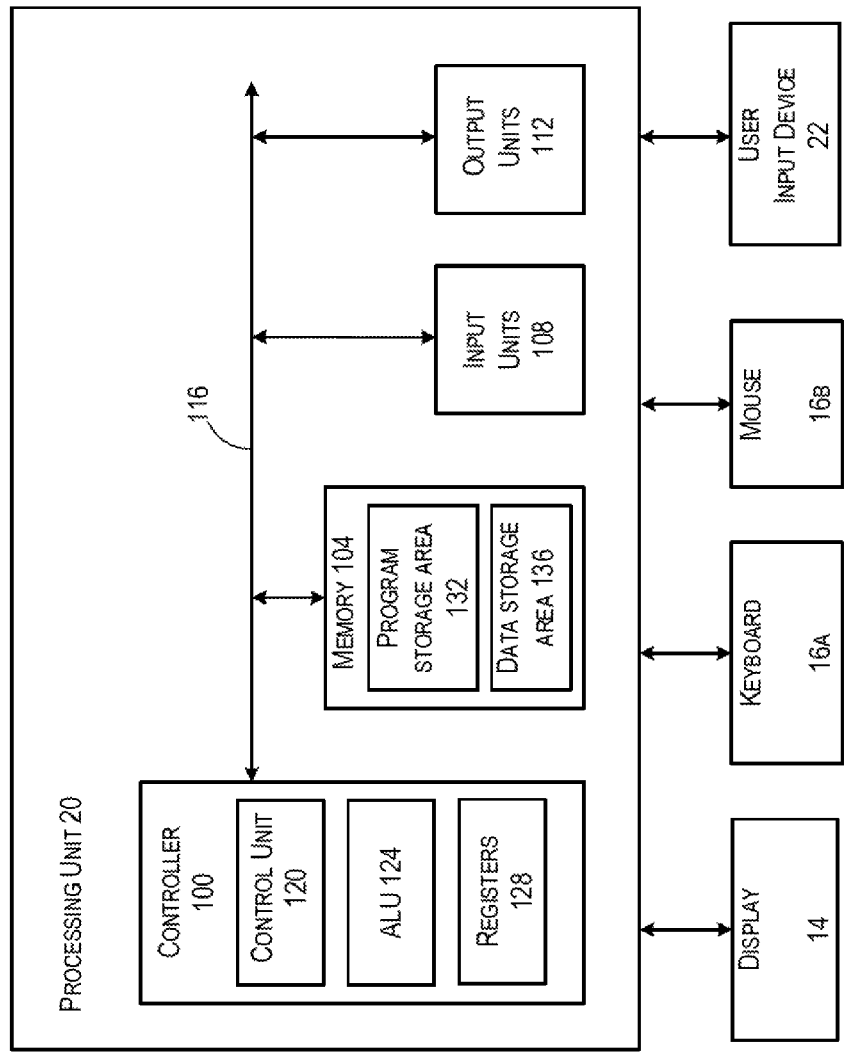
FIG. 6 is a block diagram of the visualization system of FIG. 1.

FIG. 6 illustrates the internal communicative couplings and various structural components of the visualization system 10. The processing unit 20 is coupled to the display 14, and the user input devices 16a, 16b. If the user input actuator 22 is a separate device, the processing unit 20 is also coupled to the user input actuator 22. The processing unit 20 includes combinations of hardware and software that are operable to, among other things, receive image data from the imaging system, generate a volumetric rendering of the image data based on a transfer function, and display the resulting image on the display 14. In the illustrated construction, the processing unit 20 includes a controller 100 (e.g., a microcontroller or processor), a memory unit 104, input units 108, and output units 112. The controller 100, the memory unit 104, and the input and output units 108, 112 are connected by one or more control and/or data buses (e.g., common bus 116).

The control and/or data buses 116 are shown generally in FIG. 6 for illustrative purposes. The use of one or more control and/or data buses for the interconnection between and communication among various modules and components would be known to a person skilled in the art in view of the invention described herein. In some embodiments, the controller 100 is implemented partially or entirely on a semiconductor (e.g., a field programmable gate array (FPGA) semiconductor) chip. In some constructions, the processing unit 20 includes additional circuitry external to the controller 100. For example, the processing unit 20 may include a power input module that receives power from an external power source and adapts the power as necessary for the electrical components of the processing unit 20. The controller 100 includes among other things, a control unit 120, an arithmetic logic unit ("ALU") 124, and a plurality of registers 128 (shown as a group of registers in FIG. 6), and is implemented using a known computer architecture, such as a modified Harvard architecture, a von Neumann architecture, etc.

The memory unit 104 includes, for example, a program storage area 132 and a data storage area 136. The program storage area 132 and the data storage area 136 can include combinations of different types of memory, such as read-only memory ("ROM"), random access memory ("RAM") (e.g., dynamic RAM, synchronous DRAM, electrically erasable programmable read only memory (EEPROM), flash memory, a hard disk, an SD card, or other suitable magnetic, optical, physical, or electronic memory devices. The controller 100 is connected to the memory unit 104 and executes software instructions that are capable of being stored in a RAM of the memory unit 104 (e.g., during execution), a ROM of the memory unit 104 (e.g., on a generally permanent basis), or another non-transitory computer readable medium such as another memory or a disc. Software included in the visualization of different volumetric images can be stored in the memory unit 104 of the processing unit 20. The software includes, for example, firmware, one or more applications, program data, filters, rules, one or more program modules, and other executable instructions. The processing unit 20 is configured to retrieve from the memory unit 104 and execute, among other things, instructions related to the adjustment of transfer functions and to the generation of volumetric rendering of images. In other constructions, the processing unit 20 includes additional, fewer, or different components.

Figure 7:
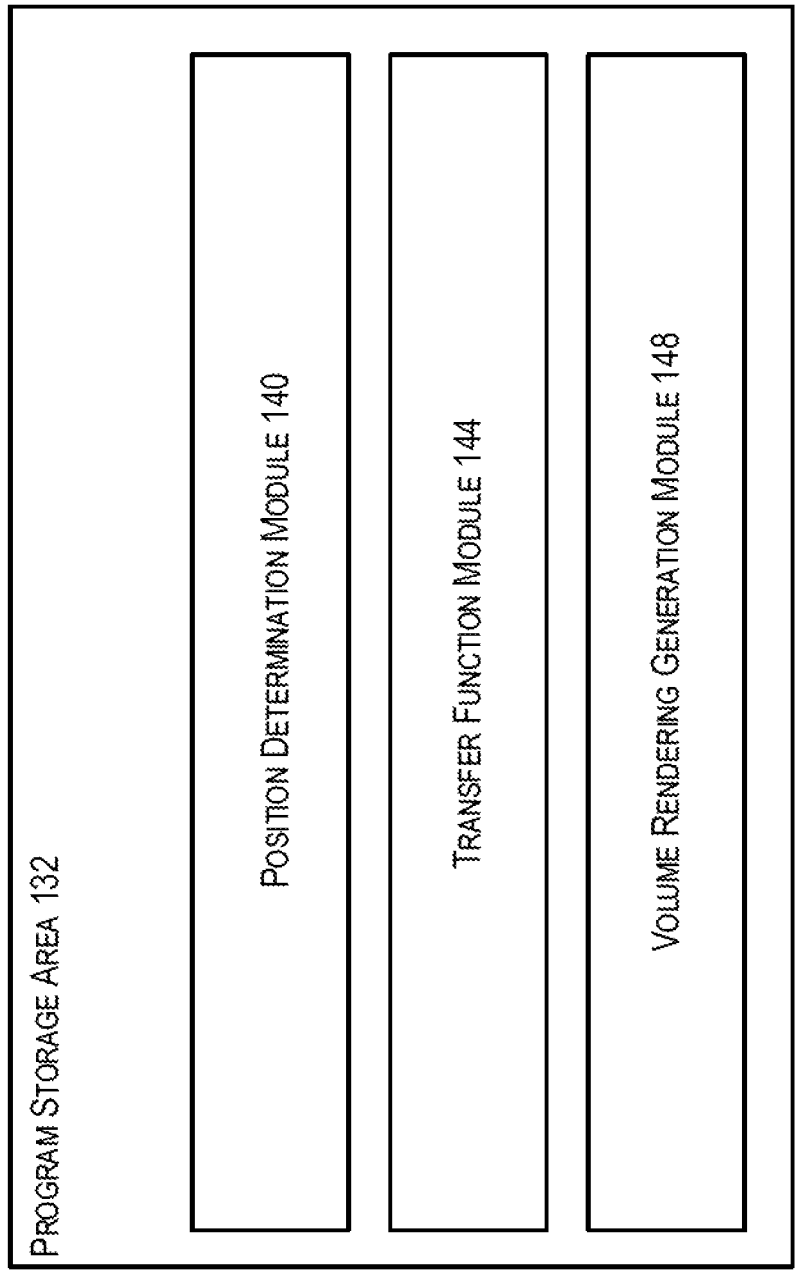
FIG. 7 is a block diagram of the structure of program storage data stored in a memory unit of the visualization system of FIG. 1.

As shown in FIG. 7, the program data includes a position determining module 140, a transfer function module 144, and a volume rendering generating module 148. The controller 100 retrieves instructions in each of the modules 140, 144, 148 to generate the desired volume renderings of the 3D image data. The position determining module 140 includes instructions that, when executed by the controller 100, determine the position of the user input actuator 22. The transfer function module 144 includes instructions that, when executed by the controller 100, generate a transfer function or a desired blending of two transfer functions according to the determined position of the user input actuator 22. The volume rendering generating volume 148 generates a desired volumetric rendering of the 3D image data according to the transfer function, or transfer functions, generated by the transfer function module 144.

Figure 8:
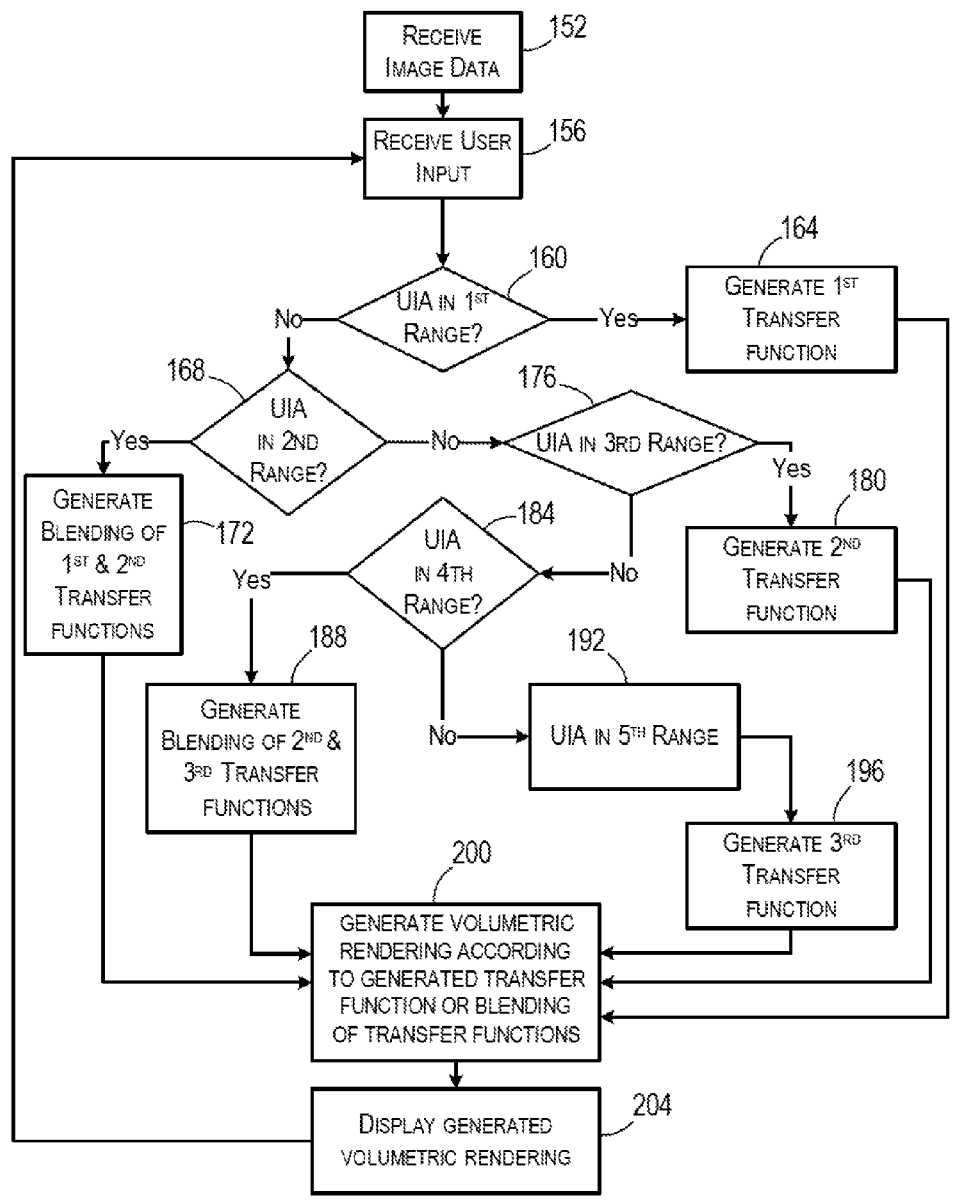
FIG. 8 is a flowchart of a method of generating and displaying a volumetric rendering using the visualization system of FIG. 1.

FIG. 8 illustrates a method for controlling and adjusting how a volumetric image is displayed on the screen based on the position of the user input actuator 22. The visualization system 10 (e.g., the controller 100) receives the 3D image data from an imaging system (step 152). The controller 100 then receives a signal from the user input actuator 22 indicative of a user control input (step 156). The user input may include a translation of the user input actuator 22 to a desired position or range. The controller 100 then determines the position of the user input actuator 22 through the position determining module 140 and determines whether the user input actuator 22 is positioned in the first range 34, the second range 38, the third range 42, the fourth range 46, or the fifth range 50.

The controller 100 generates an appropriate transfer function or blending of transfer functions based on the position of the user input actuator 22. If the user input actuator 22 is positioned in the first range 34 (step 160), the controller 100 generates a first transfer function through the transfer function module 144 (step 164). If the user input actuator 22 is positioned in the second range 38 (step 168), the controller 100 generates a blending of the first transfer function and a second transfer function based on the specific location of the user input actuator 22 within the second range 38 (step 172). If the user input actuator 22 is positioned in the third range 42 (step 176), the controller 100 generates the second transfer function (step 180). If the user input actuator 22 is positioned in the fourth range 46 (step 184), the controller 100 generates a blending of the second and third transfer functions based on the specific location of the user input actuator 22 within the fourth range 38 (step 188). Lastly, if the user input actuator 22 is positioned in the fifth range 50 (step 192), the controller 100 generates the third transfer function (step 196).

Once the transfer function, or a blending of transfer functions, has been generated by the transfer function module (e.g., after steps 164, 172, 180, 188, 196), the controller 100 generates a volumetric rendering according to the generated transfer function (step 200), and displays the generated volumetric rendering on the display 14 (step 204). While displaying the generated volumetric rendering, the controller 100 continues to monitor for a received user input to detect changes in the position of the user input actuator 22. If the user changes the position of the user input actuator 22, steps 156-204 are repeated to generate and display an updated volumetric rendering based on the new position of the user input actuator 22.

As discussed above, the controller 100 generates a blending between two transfer functions as the user input actuator 22 is moved through the second range from the first range/position to the third range/position and as the user input actuator 22 is moved through the fourth range from the third range/position to the fifth range/position. This "blending" can be generated in different ways as dictated by the user or as predetermined by the system. In the illustrated implementation, the system implements a first method (FIG. 9) for generating the blending of the first and second transfer functions and a second method (FIG. 10) for generating the blending of the second and third transfer functions. In other implementations, the second method can be used to generate the blending of the first and second transfer function and the first method to generate the blending of the second and third transfer functions.

Figure 9:
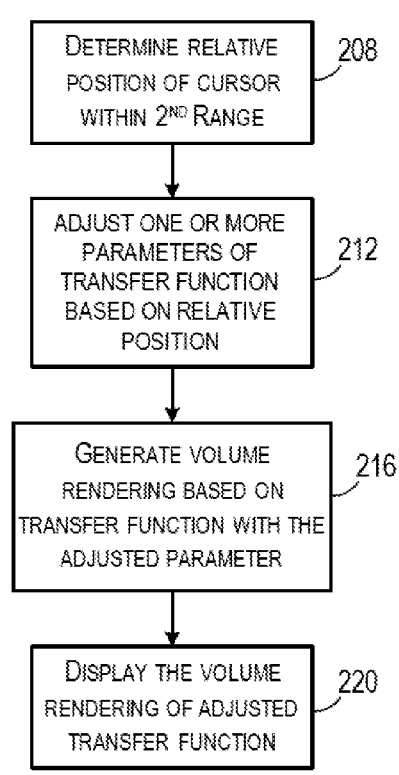
FIG. 9 is a flowchart of a first method of blending two transfer functions to generate and display an image on the visualization system of FIG. 1.

For example, as shown in FIG. 9, the position of the user input actuator 22 within the second range can be used to adjust a specific parameter, or multiple parameters, of a transfer function to generate the blending of two transfer functions. Because, as discussed above, the second range 38 includes several positions, the controller 100 determines the specific position of the cursor (e.g., the position indicator 30 of the user input indicator 22) within the second range (step 208). The controller 100 uses the transfer function module 144 to adjust one or more parameters of the transfer function based on the specific location of the cursor (step 212). In the illustrated example, the transfer function module 144 adjusts one or more parameter values of the first transfer function to approximate the second transfer function. In other words, the transfer function module 114 determines and adjusts parameter values of the first transfer function such that the volumetric rendering generated based on the adjusted first transfer function is a close approximation of the volumetric rendering generated based on the second transfer function. As the cursor moves from the first position 54 to the third position 62, the approximation of the second transfer function using the first transfer function becomes closer and closer, until, upon the cursor reaching the third position 62, the approximation of the second transfer function using the first transfer function is a closest approximation of the second transfer function. Stated differently, when the cursor is closest to the first position 54, the transfer function module 114 adjusts slightly one or more parameter values to begin approximating the visual output of the second transfer function that will be generated when the cursor reaches the third position 62. However, when the cursor is closest to the third position 62, the transfer function module 114 adjusts significantly one or more parameter values to most closely approximate the visual output that will be generated by the second transfer function when the cursor reaches the third position 62. Once one or more parameters for the transfer function are changed, a volumetric rendering is generated based on the adjusted transfer function (step 216) and the new updated rendering is displayed on the screen (step 220).

When generating the blending of two transfer functions according to the method of FIG. 9, the transfer functions and the adjusted parameters are selected such that the displayed volumetric rendering transitions towards an image as would be generated by a second transfer function as the parameter(s) is adjusted. For example, color distribution parameters can be adjusted. In addition, although only the first transfer function is described as being adjusted, the transfer function module 144 can additionally or alternatively adjust a parameter of the second transfer function. In other words, in such embodiments, while the cursor is in the second range 38, the volumetric rendering is displayed based on the second transfer function with adjusted parameters.

Figure 10:
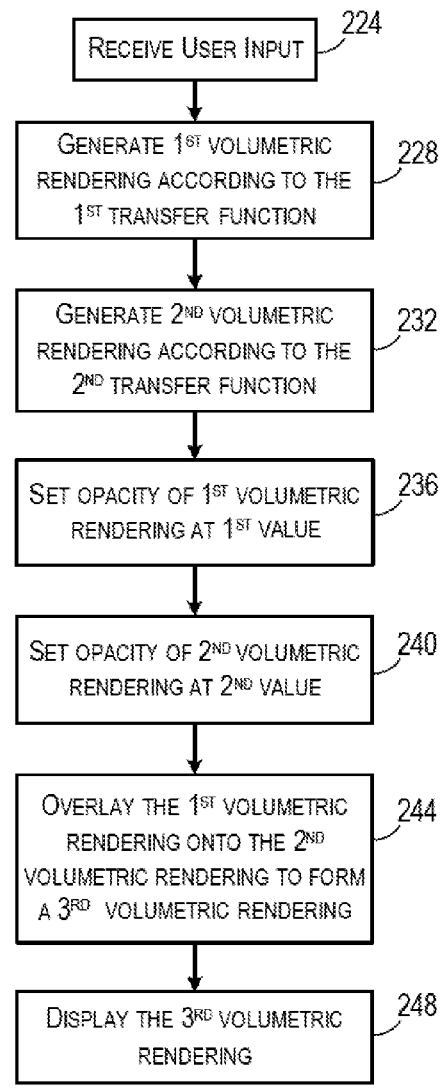
FIG. 10 is a flowchart of a second method of blending two transfer functions to generate and display an image on the visualization system of FIG. 1.

Furthermore, in some implementations, the system generates the blending of two transfer functions by generating two separate volumetric renderings according to two separate transfer functions and adjusting the opacity of each rendering as the user input actuator is moved through the second range (or through the fourth range). FIG. 10 illustrates an example of one method of blending transfer functions by adjusting a relative opacity of the volumetric rendering generated by the second transfer function and the volumetric rendering generated by the third transfer function. The controller 100 first determines the relative position of the user input actuator 22 within the fourth range 46 (step 224). The controller 100 then generates a first volumetric rendering according to a first transfer function (step 228) and generates a second volumetric rendering according to a second, different transfer function (step 232). The controller 100 then sets an opacity level for the first volumetric rendering (step 236) and an opacity level for a second volumetric rendering (step 240) based on the relative position of the user input actuator 22 within the fourth range 46. The opacity-adjusted volumetric renderings are overlaid onto each other (step 244) to form a third volumetric rendering that is displayed to the user (step 248).

The closer the user input actuator 22 is to the third range position 42, the opacity value for the first volumetric rendering decreases and the opacity value for the second volumetric rendering increases. Analogously, the opacity level for the first volumetric rendering increases and the opacity level for the second volumetric rendering decreases as the user input actuator 22 moves further from the third range position 42 and closer to the first range position 34. As a result, the second volumetric rendering is less visible when the user input actuator is located near the first range position 34 and the displayed image is predominantly influenced by the first transfer function.

In the illustrated example, the step of generating a blending of the second transfer function and the third transfer function (e.g., step 188 on FIG. 8) may refer only to determining the relative opacity level for each of the volumetric renderings based on the relative position of the cursor within the fourth range 46. The same step could alternatively include generating the volumetric rendering according to the second transfer function (step 228 of FIG. 10), generating the volumetric rendering according to the third transfer function (step 232 of FIG. 10), and determining a relative opacity level for each of the volumetric renderings (steps 236, 240 of FIG. 10). In such implementations, the step of generating the volumetric rendering according to the transfer function or blending of transfer functions generated (step 200 of FIG. 8) may correspond to overlaying the two generated volumetric renderings (one according to the second transfer function and another according to the third transfer function) at the determined relative opacity levels.

FIGS. 11-18 illustrate an example of a series of volumetric renderings that are shown on a display field 250 of the display 14 of the visualization system 10 as the user moves a linear user input actuator 22 from the far left position to the far right position. In this example, the visualization system 10 has been configured to allow the user (e.g., an imaging specialist) to generate volumetric renderings according to three different transfer functions (e.g., a first transfer function, a second transfer function, and a third transfer function) and to blend the transfer functions to generate customized volumetric renderings. In this example, the first transfer function generates a rendering that shows the details of the skin of a patient (i.e., FIG. 11). The first transfer function defines a "skin opacity" parameter that assigns opacity values to voxel values in the range of skin. To show the details of the skin of the patient, the skin opacity parameter in the first transfer function is set to "1" (e.g., full opaque). The second transfer function highlights the bone structure of the patient (i.e., FIG. 14). The second transfer function also assigns opacity values to voxel values in the range of skin. To highlight the bone structure of the patient, the skin opacity parameter in the second transfer function is set to "0" (e.g., not opaque). The third transfer function highlights both the bone and the roots of the patient's teeth (i.e., FIG. 18). In some embodiments, the third transfer function also defines the skin opacity parameter, while in other embodiments, the third transfer function does not specifically define the skin opacity parameter.

Figure 11:
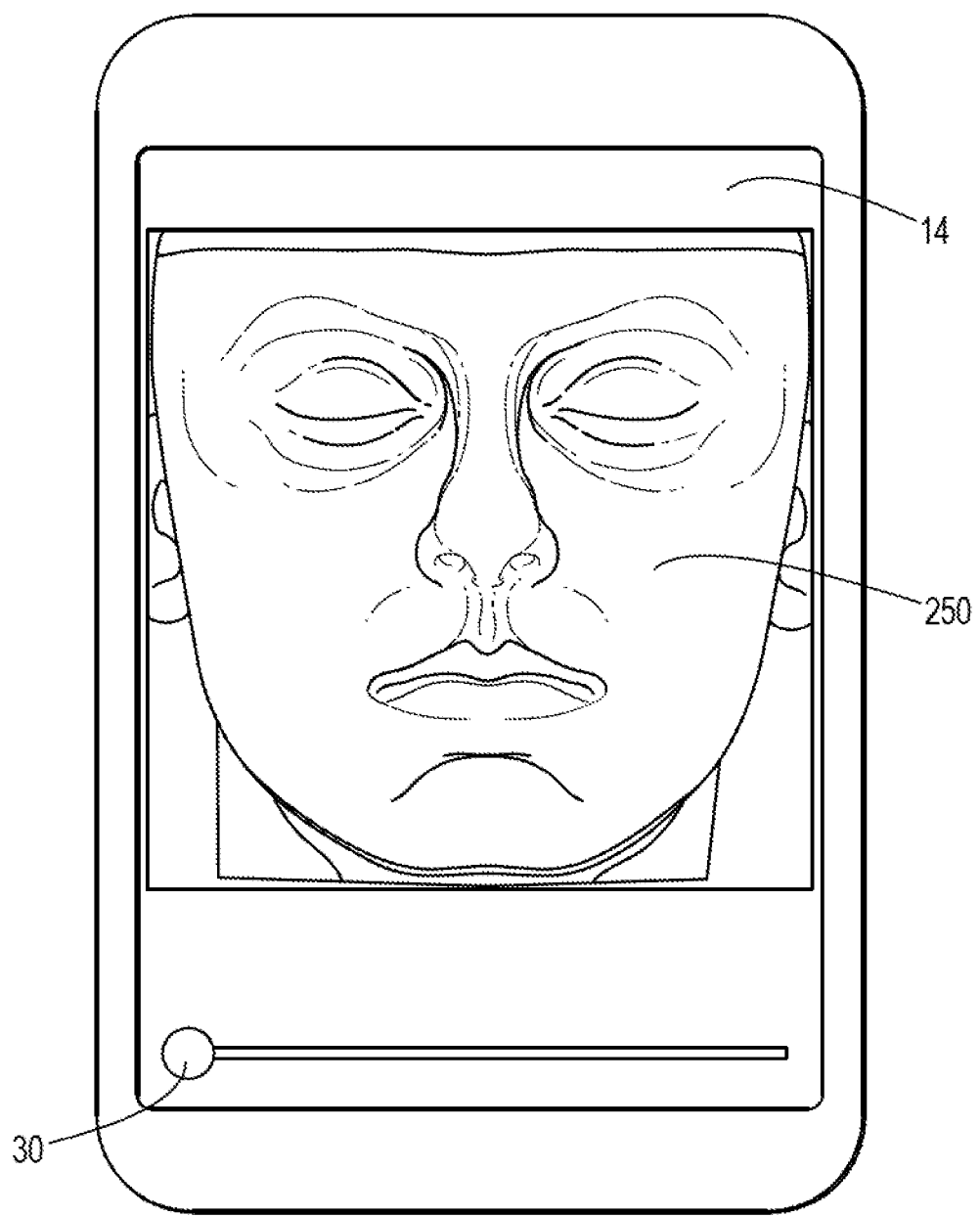
FIG. 11 is a user interface displayed on a screen of the visualization system of FIG. 1 when the user input actuator is positioned in a first range.

Beginning in FIG. 11, the position indicator 30 of the user input actuator is located at the far left of the linear path 26 and, therefore, is positioned in the first range/position 34. As a result, the volumetric rendering shown on the display field 15 of the screen in the example of FIG. 11 is generated entirely based on the first transfer function. Since the volumetric rendering shown in FIG. 11 is generated based solely on the first transfer function, the skin opacity parameter is set to "1."

Figure 12:
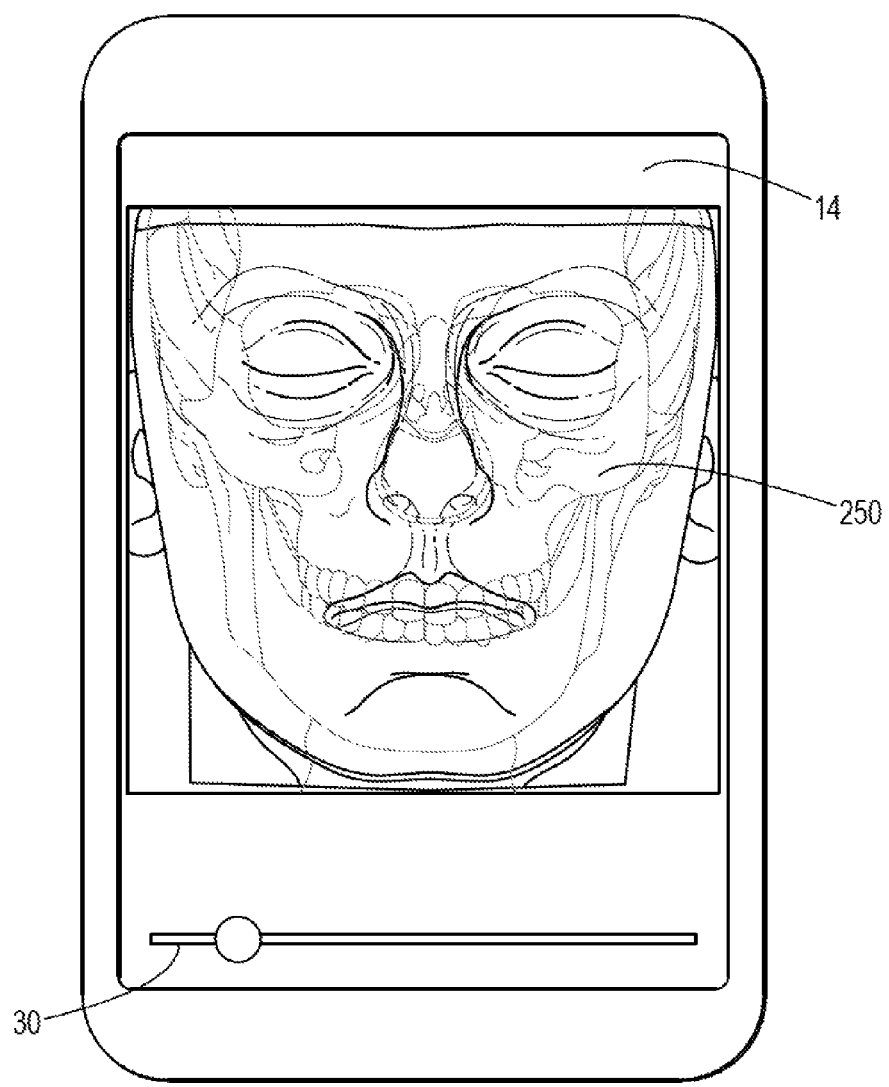
FIG. 12 is the user interface of FIG. 11 when the user input actuator is moved to a first location in a second range.

In FIG. 12, the position indicator 30 has been moved into the second range 38 and, according to the method of FIG. 9, the skin opacity parameter of the first transfer function is adjusted to approximate the second transfer function. To generate the volumetric rendering shown in FIG. 12, the skin opacity parameter value is adjusted to approximately 0.75, thereby lowering the opacity of the skin voxel values and allowing the underlying bone structure to become slightly more visible.

Figure 13:
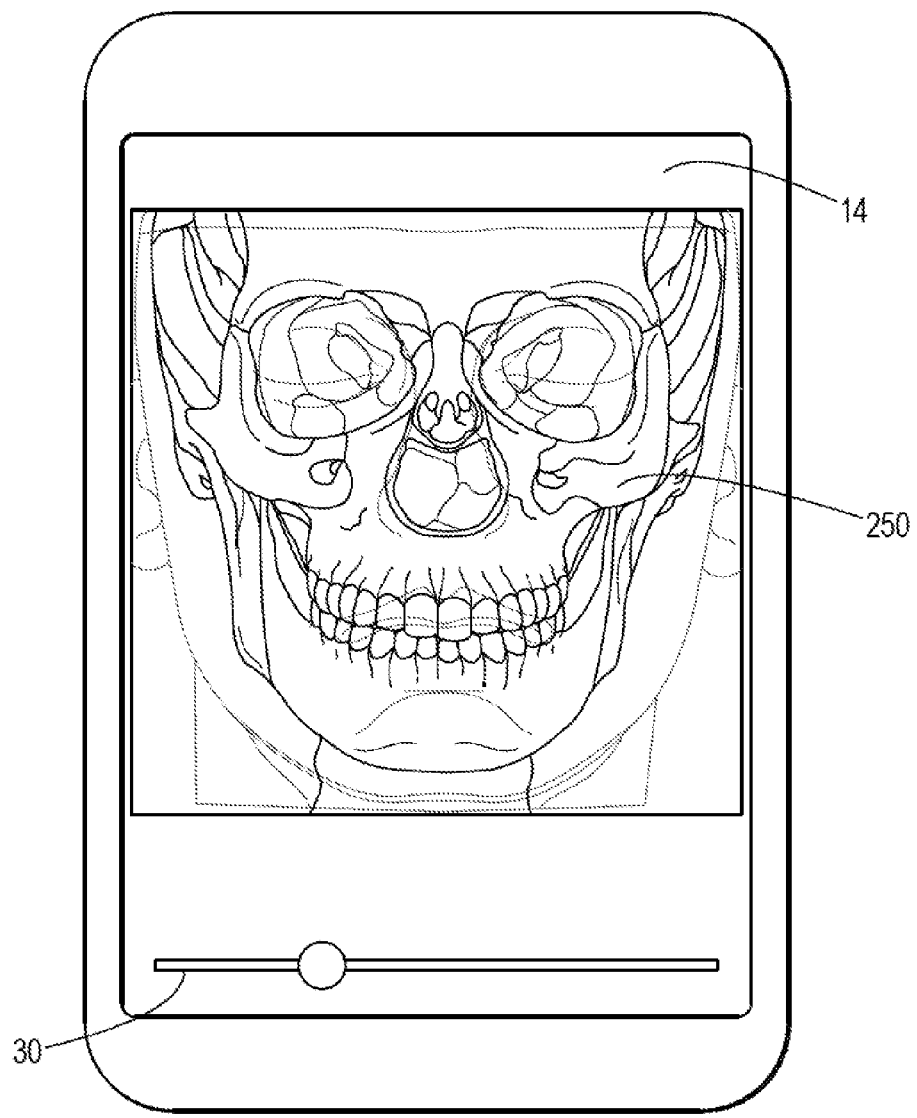
FIG. 13 is the user interface of FIG. 11 when the user input actuator is moved to a second location in the second range.

In FIG. 13, the position indicator 30 of the user input actuator 22 is moved to a second position within the second range 38 and is now closer to the third range position 42. As the position indicator 30 is moved further towards the right, the skin opacity parameter value continues to decrease and the first transfer function better approximates the second transfer function. In the volumetric rendering displayed in FIG. 13, the skin opacity parameter value is at approximately 0.25. As shown in FIGS. 12 and 13, when the position indicator 30 is closer to the first position 34, the skin opacity parameter is set to a value that is closer to that of the first transfer function. Analogously, when the position indicator 30 is closer to the third range/position 42, the skin opacity parameter is set to a value that is closer to that of the second transfer function.

Figure 14:
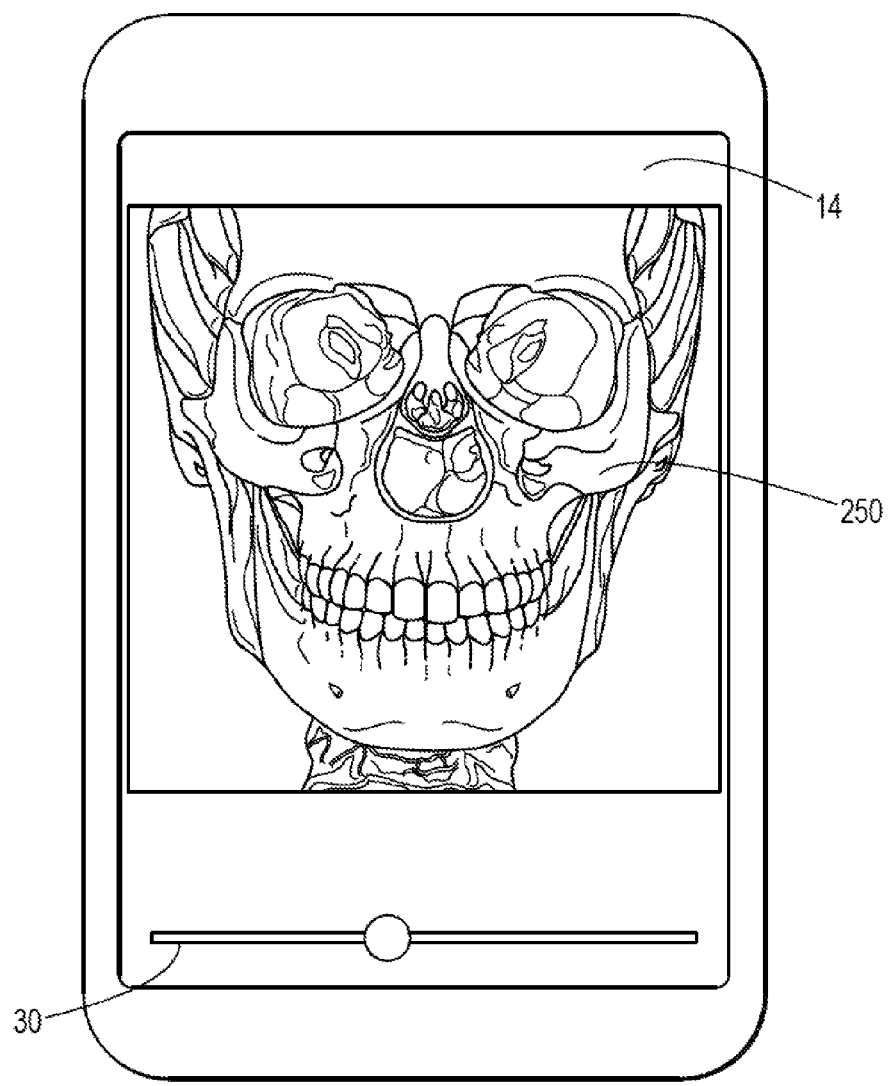
FIG. 14 is the user interface of FIG. 11 when the user input actuator is moved to a position in a third range.

In FIG. 14, the position indicator 30 of the user input actuator 22 has been moved to the third range position 42. Therefore, the displayed image is generated entirely based on the second transfer function, which in this example, does not include a skin opacity parameter (e.g., the skin opacity parameter is set to "0". Since the second transfer function does not include the skin opacity parameter, the volumetric rendering shown in FIG. 14 shows the bone structure of the patient without any details of the skin surface. Although FIGS. 12-13 have been described as using the method of FIG. 9 to blend two transfer functions, FIGS. 12-13 (or similar volumetric renderings) could alternatively be generated using the method of FIG. 10 to blend two transfer functions.

Figure 15:
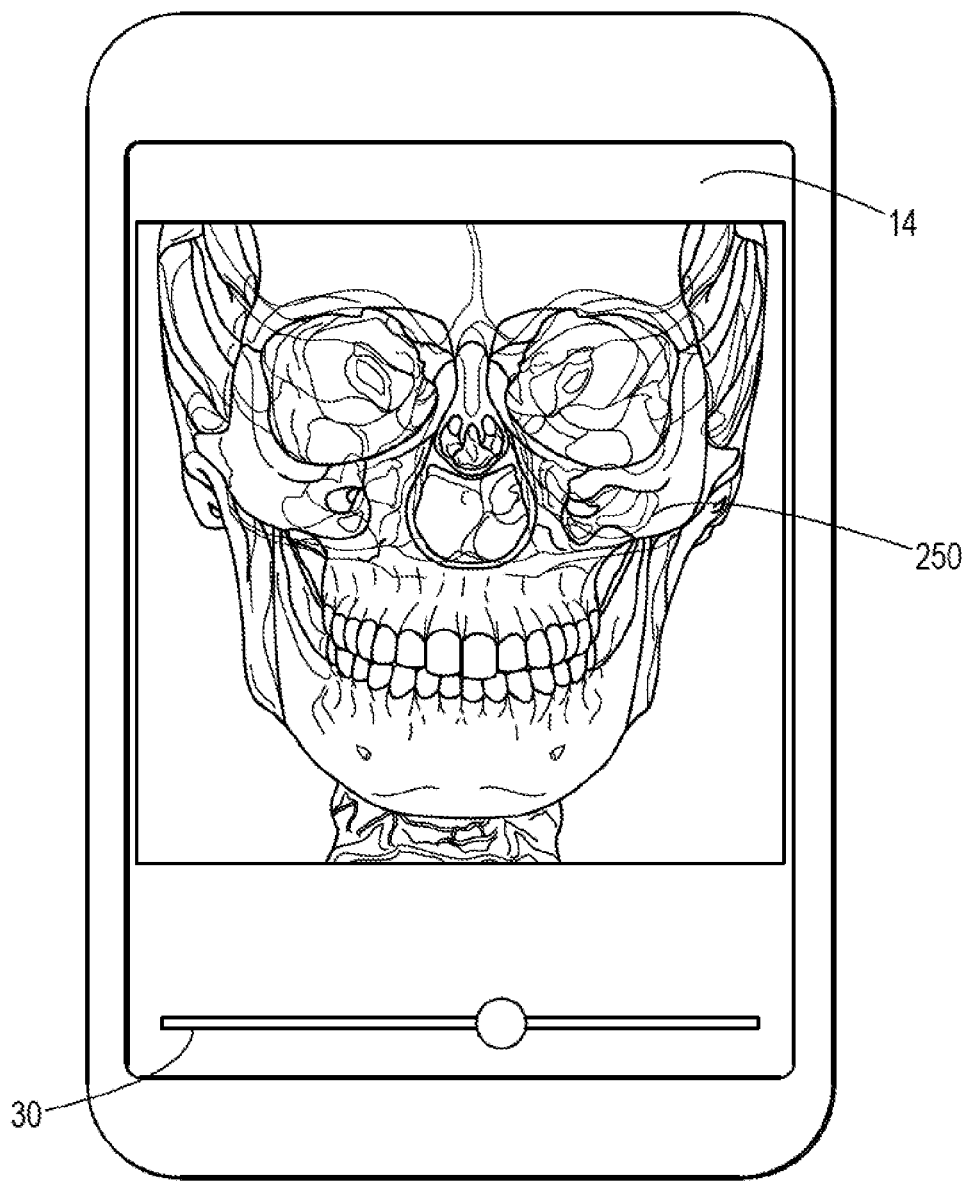
FIG. 15 is the user interface of FIG. 11 when the user input actuator is moved to a first location in a fourth range.

In FIG. 15, the position indicator 30 of the user input actuator 22 has been moved into the fourth range 46 and, therefore, the displayed image is generated based on both the second transfer function (i.e., bone) and the third transfer function (i.e., teeth roots). In the illustrated example, the method of FIG. 10 is used to blend the second and third transfer functions and thereby generate FIGS. 15-17. In other words, as the cursor moves from the far left side of the fourth range 46 to the far right side of the fourth range 46, the opacity of the volumetric rendering generated according to the second transfer function is reduced while the opacity of the volumetric rendering generated according to the third transfer function is increased, the two volumetric renderings are then overlaid onto each other to generate the volumetric renderings displayed on FIGS. 15-17. FIG. 15 shows the user input actuator 22 in a first position of the fourth range 46 closest to the third range 42. A low-opacity version of a volumetric rendering generated according to the third transfer function is overlaid and, therefore, the dental root structure of the patient is visible on the screen. In the volumetric rendering displayed in FIG. 15, the first volumetric rendering (highlighting bone structure) is set to an opacity of approximately 0.75 while the second volumetric rendering (highlighting both bone and teeth roots) is set to an opacity of approximately 0.25. Thus, the volumetric rendering of FIG. 15 is based predominantly on the second transfer function.

Figure 16:
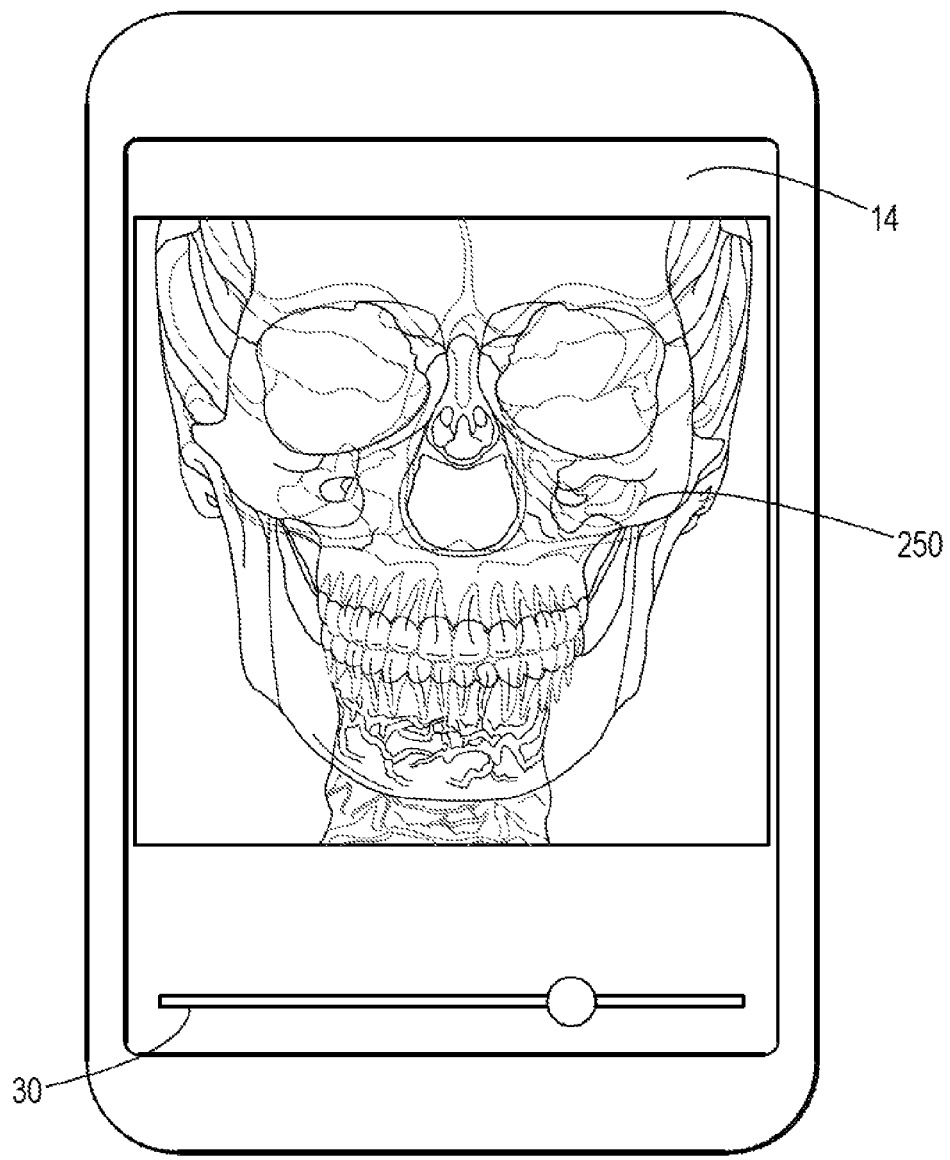
FIG. 16 is the user interface of FIG. 11 when the user input actuator is moved to a second location in the fourth range.
Figure 17:
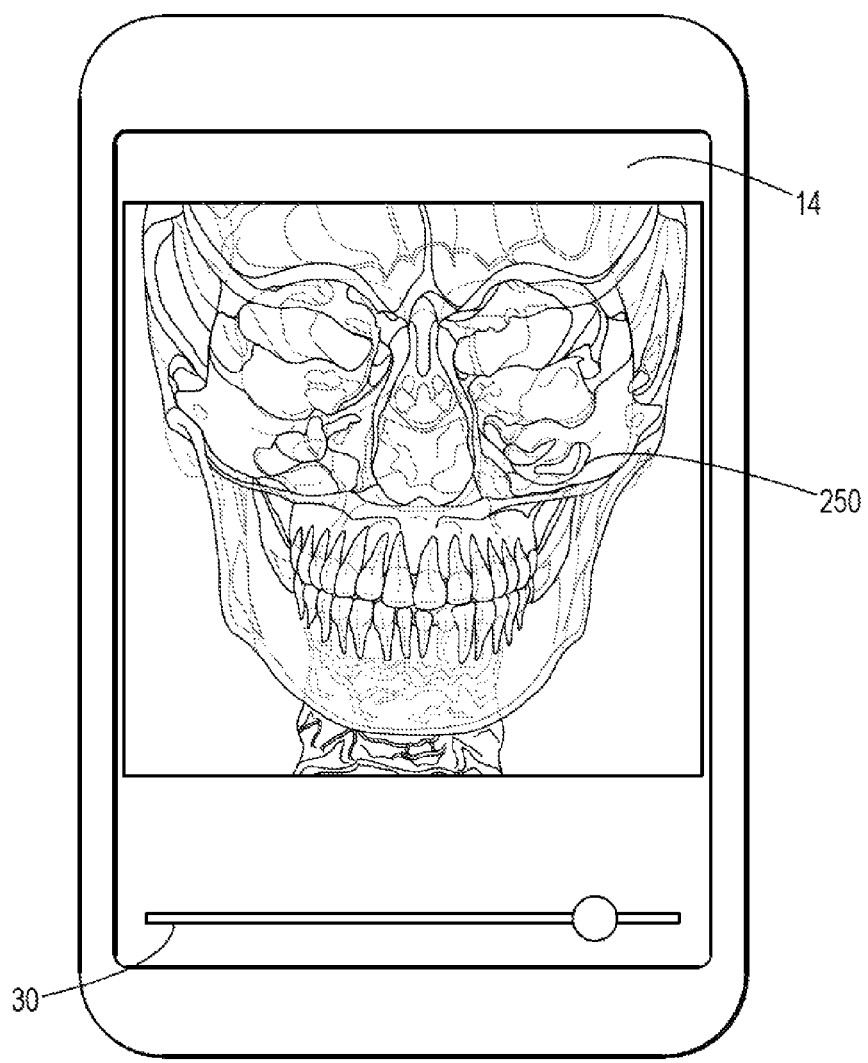
FIG. 17 is the user interface of FIG. 11 when the user input actuator is moved to a third location in the fourth range.

FIG. 16 then illustrates the user input actuator 22 in a second position of the fourth range 46 closer to the fifth range position 50. In the volumetric rendering displayed in FIG. 16, the first volumetric rendering is set to an opacity of approximately 0.5 while the second volumetric rendering is also set to an opacity of approximately 0.5. Thus, the volumetric rendering of FIG. 16 is relatively equally based on the second and third transfer functions. Finally, in FIG. 17 the user input actuator 22 is in a third position of the fourth range 46 closest to the fifth range 50. In the volumetric rendering displayed in FIG. 17, the first volumetric rendering is set to an opacity of approximately 0.25 while the second volumetric rendering is set to an opacity of approximately 0.75. Thus, the volumetric rendering of FIG. 17 is based predominantly on the third transfer function.

Figure 18:
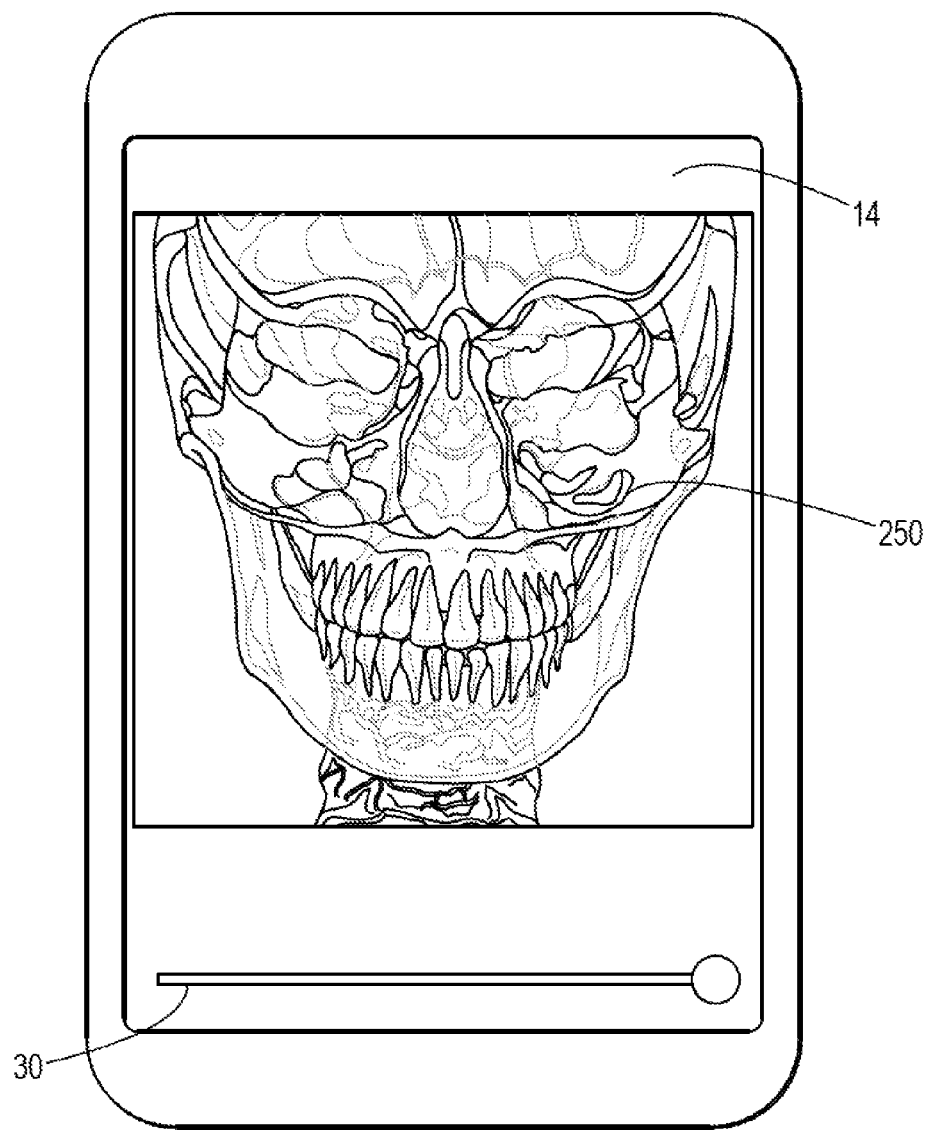
FIG. 18 is the user interface of FIG. 11 when the user input actuator is moved to a position in a fifth range.

In FIG. 18, the position indicator 30 of the user input actuator 22 has been moved to the fifth range position 50. Therefore, the displayed image is generated entirely based on the third transfer function (the opacity value for the third transfer function is set to 1.0) and shows the dental root image of the patient without any bone structure overlay. Although FIGS. 15-17 have been described as using the method of FIG. 10 to blend two transfer functions, FIGS. 15-17 (or similar volumetric renderings) could alternatively be generated using the method of FIG. 9 to blend two transfer functions.

Although the examples of FIGS. 11-18 allow a user to generate several different volumetric renderings based on three different transfer functions, in other implementations, the visualization system 10 may be configured to only allow a user to generate volumetric renderings according to fewer transfer functions (i.e., adjusting parameters of a single transfer function or adjusting opacity of only two volumetric renderings) or according to more transfer functions (i.e., various combinations and blending of four of more transfer functions). For example, in other constructions, the visualization system 10 may allow a user to generate volumetric renderings according to four or more different transfer functions. Similarly, in the example discussed above the first transfer function highlights skin, the second transfer function highlights bone, and the third transfer function allows for both bone and teeth roots to be highlighted. In other constructions, however, different transfer functions that highlight different anatomical structures and/or aspects are used in conjunction with the user input actuator 22 and the controller 100. Additionally, in the example above, the visualization system 10 uses two different methods for blending two transfer functions. In other constructions, the visualization system 10 may only utilize one method for blending two transfer functions, or may utilize a different method of blending two transfer functions.

In some implementation, the user input actuator 22 displayed on the screen includes labels identifying the different ranges or indicating to the user specifically which type of volume rendering is displayed when the user input actuator 22 is placed within a range. In some implementations, labels are only included in the ranges for which the volumetric rendering is based on only one transfer function (e.g., ranges 34, 42, 50) and the user understands that the ranges between the labels include a blending of the two adjacent transfer functions.

Figure 19:
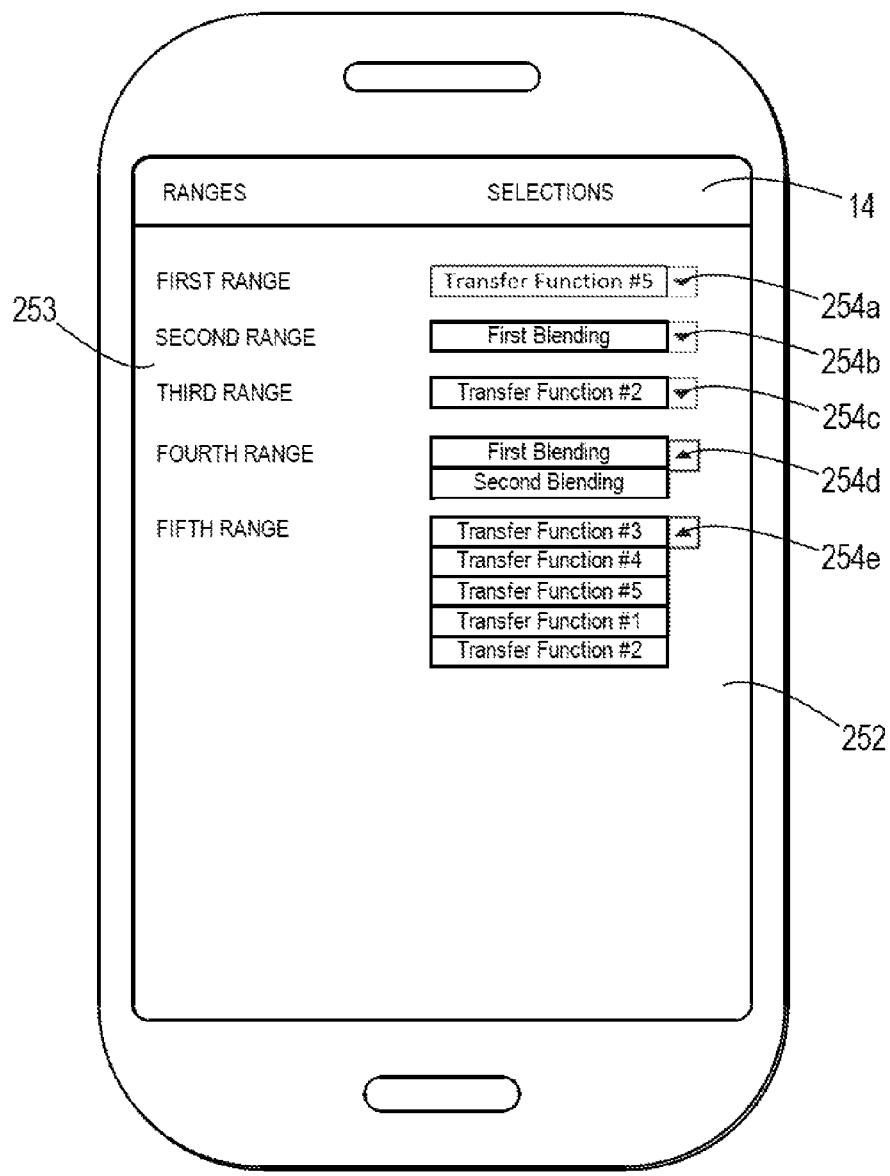
FIG. 19 is a graphical user interface displayed on the visualization system of FIG. 1 for configuring the user input actuator.

In some constructions, the user can define which transfer functions are associated with each position along the path 26 of the user input actuator 22. FIG. 19 illustrates a graphical user interface 252 shown in a display field 253 to configure the user input actuator 22. As shown in FIG. 19, different drop down menus 254a-e are available for each range of the user input actuator 22. Thus, the user can determine which transfer function is used to generate the volumetric rendering when the user input actuator 22 is positioned at particular positions (i.e., first range 24, second range 42, and fifth range 50). The user can also determine whether to use the first blending method (FIG. 9) or the second blending method (FIG. 10) for the second and fourth ranges 38, 46. Furthermore, in some implementations, the drop down menus for the second range 38 and the fourth range 46 can be used to select a specific parameter of a transfer function for a neighboring range/position that is to be adjusted as the position indicator of the user input actuator 22 is moved.

Thus, the invention provides, among other things, a visualization system that allows a user to easily generate volumetric renderings based on a blending of two transfer functions. Various features and advantages of the invention are set forth in the following claims.

What is claimed is:
1. A visualization system for displaying volumetric renderings, the system comprising:
 a display;
 a user input actuator movable over a first range, a second range, and a third range, the second range being located between the first range and the third range;
 a processor coupled to the user input actuator and the display, the processor configured to
  generate, with a first transfer function, a first volumetric rendering from a first data set when the user input actuator is positioned in the first range,
  generate, with a second transfer function, a second volumetric rendering from the first data set when the user input actuator is positioned in the third range, the second transfer function being different than the first transfer function;
  generate a blended volumetric rendering with a blending of the first transfer function and the second transfer function when the user input actuator is positioned in the second range by adjusting a plurality of parameters of the first transfer function to a first plurality of parameter values, each parameter value corresponding to one of the plurality of parameters, to more closely approximate the second volumetric rendering generated according to the second transfer function, wherein the blended volumetric rendering is generated with the first transfer function at the first plurality of parameter values; and display the blended volumetric rendering on the display.

2. The system of claim 1, wherein the display includes a graphical user interface, wherein the user input actuator includes a virtual linear actuator displayed on the graphical user interface, and wherein the processor is further configured to receive a user input including a linear translation of the virtual linear actuator;

determine a position of the virtual linear actuator based on the linear translation; and determine whether the user input actuator is positioned in the first range, the second range, or the third range based on the determined position of the virtual linear actuator.

3. The system of claim 1, wherein user input actuator includes a user input device, and wherein the processor is configured to receive a user input including a physical user interaction with the user input device.

4. The system of claim 1, wherein the second range includes a first position and a second position, and wherein the processor is configured to determine a position of the user input actuator within the second range, and adjust a degree of the blending of the first and second transfer functions based on the position of the user input actuator within the second range.

5. The system of claim 4, wherein the blended volumetric rendering is generated based predominantly on the first transfer function when the user input actuator is positioned closer to the first range but within the second range.

6. The system of claim 1, wherein the processor is configured to generate the blended volumetric rendering according to a blending of the first transfer function and the second transfer function by generating, with the first transfer function, the first volumetric rendering, generating, with the second transfer function, the second volumetric rendering, setting an opacity of the first volumetric rendering to a first value and an opacity of the second volumetric rendering to a second value, wherein the opacity of the first volumetric rendering is set relative to the opacity of the second volumetric rendering based on a position of the user input actuator, and overlaying the first volumetric rendering with the first opacity value onto the second volumetric rendering with the second opacity value to form the blended volumetric rendering.

7. The system of claim 1, wherein the processor is further configured to receive a user input indicating a movement of the user input actuator;

determine a position of the user input actuator after the user input actuator is moved;

generate a second blended volumetric rendering based on the position of the user input actuator; and display the second blended volumetric rendering on the display.

8. The system of claim 1, wherein the user input actuator is further movable over a fourth range, and wherein the processor is further configured to generate the blended volumetric rendering according to a third transfer function when the user input actuator is positioned in the fourth range.

9. The system of claim 1, wherein the processor is further configured to receive a user input through the user input actuator while displaying the blended volumetric rendering, the user input including movement of the user input actuator.

10. The system of claim 1, wherein the second range is larger than each of the first range and the third range.

11. A visualization system for displaying volumetric renderings, the system comprising:

a display;

a user input actuator movable over a first range, a second range, and a third range, the second range being located between the first range and the third range;

a processor coupled to the user input actuator and the display, the processor configured to generate, with a first transfer function, a first volumetric rendering from a first data set when the user input actuator is positioned in the first range, generate, with a second transfer function, a second volumetric rendering from the first data set when the user input actuator is positioned in the third range, the second transfer function being different than the first transfer function;

generate a blended volumetric rendering with a blending of the first transfer function and the second transfer function when the user input actuator is positioned in the second range by adjusting a plurality of parameters of the second transfer function to a first plurality of parameter values, each parameter value corresponding to one of the plurality of parameters, to more closely approximate a volumetric rendering generated with the first transfer function, wherein the blended volumetric rendering is based on the second transfer function at the first plurality of parameter values; and display the blended volumetric rendering on the display.

12. A method of displaying volumetric renderings comprising:

receiving a user input via a user input actuator, the user input actuator being movable over a first range, a second range, and a third range, the second range located between the first range and the third range;

determining a position of the user input actuator in response to the user input;

generating, with a first transfer function, a first volumetric rendering from a first set of data when the user input actuator is positioned in the first range;

generating, with a second transfer function, a second volumetric rendering from a first set of data when the user input actuator is positioned in the third range;

generating a blended volumetric rendering of the first volumetric rendering and the second volumetric rendering with a blending of the first transfer function and the second transfer function when the user input actuator is positioned in the second range wherein generating the blended volumetric rendering with the blending of the first transfer function and the second transfer function includes adjusting a parameter of the first transfer function to a first parameter value to more closely approximate the second transfer function, and generating the blended volumetric rendering based on the first transfer function at the first parameter value; and displaying the blended volumetric rendering on the display.

13. The method of claim 12, wherein determining a position of the user input actuator includes determining whether the user input actuator is positioned in a first position or a second position of the second range of the user input actuator.

14. The method of claim 13, wherein generating the blended volumetric rendering with a blending of the first transfer function and the second transfer function includes determining a position of the user input actuator within the second range, and adjusting a degree of blending based on the position of the user input actuator within the second range.

15. The method of claim 14, wherein adjusting the degree of blending includes generating the blended volumetric rendering based predominantly on the first transfer function when the user input actuator is positioned closer to the first range but within the second range.

16. The method of claim 14, wherein generating the blended volumetric rendering according to the blending of the first transfer function and the second transfer function includes
generating, with the first transfer function, the first volumetric rendering,
generating, with the second transfer function, the second volumetric rendering,
setting an opacity of the first volumetric rendering to a first value and an opacity of the second volumetric rendering to a second value, wherein the opacity of the first volumetric rendering is set relative to the opacity of the second volumetric rendering based on a position of the user input actuator, and
overlaying the first volumetric rendering with the first opacity value onto the second volumetric rendering with the second opacity value to form the blended volumetric rendering.

17. The method of claim 12, further comprising
receiving a second user input indicating movement of the user input actuator;
determining a second position of the user input actuator after the user input actuator is moved;
generating a second blended volumetric rendering based on the second position of the user input actuator; and
displaying the second blended volumetric rendering on the display.

18. The method of claim 12, wherein the user input actuator is also movable over a fourth range, and further comprising generating a second blended volumetric rendering based on a third transfer function when the user input actuator is positioned in the fourth range.

19. The method of claim 12, wherein receiving a user input includes receiving the user input via the user input actuator while displaying the blended volumetric rendering.

20. A method of displaying volumetric renderings comprising:
receiving a user input via a user input actuator, the user input actuator being movable over a first range, a second range, and a third range, the second range located between the first range and the third range;
determining a position of the user input actuator in response to the user input;
generating, with a first transfer function, a first volumetric rendering from a first set of data when the user input actuator is positioned in the first range;
generating, with a second transfer function, a second volumetric rendering from a first set of data when the user input actuator is positioned in the third range;
generating a blended volumetric rendering of the first volumetric rendering and the second volumetric rendering with a blending of the first transfer function and the second transfer function when the user input actuator is positioned in the second range wherein generating the blended volumetric rendering with the blending of the first transfer function and the second transfer function includes adjusting a parameter of the second transfer function to a first parameter value to more closely approximate the first transfer function, and generating the blended volumetric rendering based on the second transfer function at the first parameter value; and
displaying the blended volumetric rendering on the display.

* * * * *